(12) United States Patent
Danz

(10) Patent No.: US 6,189,372 B1
(45) Date of Patent: Feb. 20, 2001

(54) METHOD FOR BALANCING A BODY OF REVOLUTION

(75) Inventor: Günter Danz, Grosszimmern (DE)

(73) Assignee: Hofmann Mess- und Auswuchttechnik GmbH & Co. KG (DE)

(*) Notice: Under 35 U.S.C. 154(b), the term of this patent shall be extended for 0 days.

(21) Appl. No.: 09/308,959
(22) PCT Filed: Sep. 29, 1998
(86) PCT No.: PCT/EP98/06194
§ 371 Date: May 27, 1999
§ 102(e) Date: May 27, 1999
(87) PCT Pub. No.: WO99/17090
PCT Pub. Date: Apr. 8, 1999

(30) Foreign Application Priority Data

Sep. 30, 1997 (DE) .............................. 197 43 578

(51) Int. Cl.⁷ .................................................. G01M 1/00
(52) U.S. Cl. ......................................................... 73/66
(58) Field of Search ............................. 73/66, 457, 458, 73/460, 462

(56) References Cited

U.S. PATENT DOCUMENTS

| | | | |
|---|---|---|---|
| 3,595,068 | * 7/1971 | Skidmore | 73/66 |
| 3,604,248 | * 9/1971 | Altmann et al. | 73/66 |
| 4,458,554 | 7/1984 | Hrastar . | |
| 4,891,981 | * 1/1990 | Schonfeld | 73/460 |
| 5,591,909 | * 1/1997 | Rothamel et al. | 73/462 |

FOREIGN PATENT DOCUMENTS 2 597 203 A1 10/1987 (FR) .
WO 96/17294 6/1996 (WO) .

OTHER PUBLICATIONS

Tech Briefs "Quick and Easy Rotor Balancing", by Ome, Guillermo, Machine Design, vol. 50, No. 1, Jan. 1978, pp. 126–127.

* cited by examiner

*Primary Examiner*—Richard A. Moller
(74) *Attorney, Agent, or Firm*—Patterson, Thuente, Skaar & Christensen, P.A.

(57) ABSTRACT

In the method for balancing a body of revolution using a balancing machine which comprises an adjustment means for positional resetting of compensation masses, firstly the compensation masses are brought into zero positions thereof, wherein the imbalance vectors produced thereby cancel each other out. Then in a known manner the imbalance vector VI present is measured in terms of its magnitude and direction. After this at least one of the compensation masses is reset by shifting through any desired angle α or by changing its distance from the axis of rotation, an additional imbalance being produced with a calibration imbalance vector V2. After this in a known manner the overall imbalance vector V3 present is measured in terms of its magnitude and direction and from the imbalance vector V1 and the overall imbalance vector V3 the calibration imbalance vector V2 is calculated from $$V2 = V3 - V1,$$

the system comprising the balancing machine and the body of revolution being calibrated. The compensation masses are so moved out of the zero positions that the imbalance vector V is compensated for to perform the balancing operation.

11 Claims, 1 Drawing Sheet

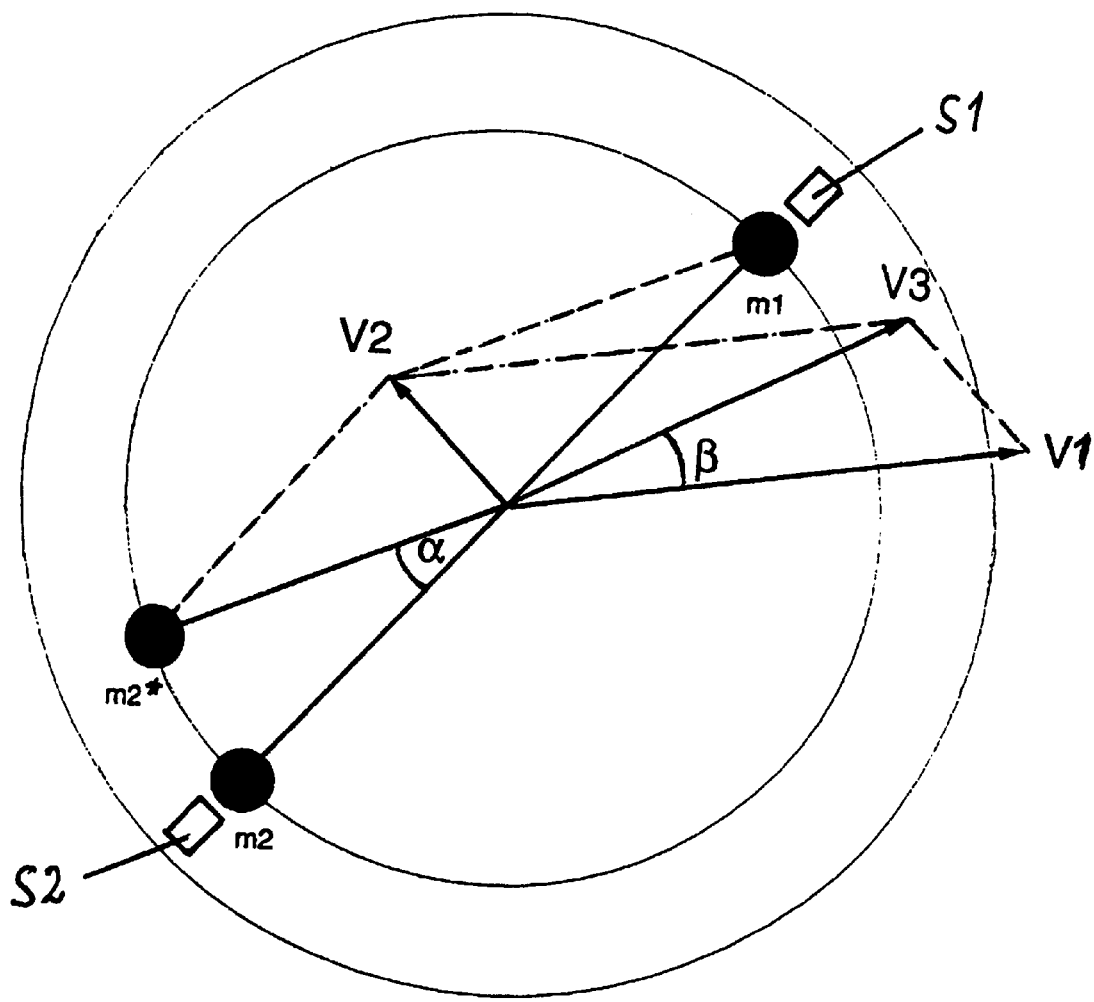

METHOD FOR BALANCING A BODY OF REVOLUTION

BACKGROUND OF THE INVENTION

1. Field of the Invention

The invention relates to a method for balancing a body of revolution comprising a balancing machine, which possesses an adjustment unit for positional adjustment or resetting of compensation masses.

2. Description of Related Art

Automatic balancing machines have so far been so operated that the compensation masses are shifted in a given direction or are spread out as long as this leads to a reduction in vibration of the machine. If during positional adjustment of the compensation masses the vibration increases, the direction of adjustment of the compensation masses is reversed. Operations are repeated in accordance with this method until a predetermined residual degree of imbalance is reached and the balancing operation is then terminated. In this respect it is a disadvantage that in such a "trial and error" method a long time is frequently required for balancing.

SUMMARY OF THE INVENTION

One object of the present invention is to devise a method for the balancing of a body of revolution, wherein in contradistinction to the "trial and error" method employed in the case of known automatic balancing machines a systematic balancing operation is performed.

For this purpose the method of the invention is characterized in that:

(a) the compensation masses are placed in a zero positions thereof, wherein the imbalance vectors produced thereby cancel each other out, (b) in a known manner the imbalance vector V1 present is measured in terms of its magnitude and direction, (c) at least one of the compensation masses is reset by shifting through any desired angle α or by changing its distance from the axis of rotation, an additional imbalance being produced with a calibration imbalance vector V2, (d) the angle α or the change in the distance is registered, (e) in a known manner the overall imbalance vector V3 present is measured in terms of its magnitude and direction, (f) from the imbalance vector V1 and the overall imbalance vector V3 the calibration imbalance vector V2 is calculated from $$V2 = V3 - V1,$$

the system comprising the balancing machine and the body of revolution being calibrated, and (g) the compensation masses are so moved out of the zero positions that the imbalance vector V is compensated for.

Calibration is consequently performed essentially by the production of an imbalance vector by defined resetting the position of a compensation mass through an angle a or resetting its distance from the axis of rotation.

An advantageous embodiment of the method of the invention is characterized in that in the step (a) in the course of one balancing operation the positional resetting of the compensation masses from the zero positions is registered in terms of the direction and/or magnitude of adjustment and the compensation masses are brought into a zero position by moving same back through the respectively traveled shift distance in the opposite direction of shift. In this respect it is an advantage that no additional provision of hardware is required for the performance of this method.

An advantageous embodiment of the method of the invention is characterized in that in step (a) the direction and/or magnitude of positional adjustment of the compensation masses is registered via an encoder means. This means that there is the advantage of detecting the actual, i.e. the absolute positions in terms of the magnitude and direction of positional resetting so that a return of the compensation masses into the zero positions may be performed accordingly.

A further advantageous embodiment of the method of the invention is characterized in that in the step (a) the direction and/or magnitude of positional resetting of the compensation masses is registered using a clock generator arranged on the adjustment unit.

A further advantageous embodiment of the method of the invention is characterized in that in the step (a) the distance the compensation masses moved is registered on the basis of the duration of the adjustment movement and the direction of adjustment is registered on the basis of the direction of turning of the adjustment unit.

A further advantageous embodiment of the method of the invention is characterized in that in the step (a) the adjustment displacement is registered on the basis of the current consumption involved in adjustment of the compensation masses and the direction of adjustment is registered on the basis of the direction of turning of the adjustment unit.

The last three advantageous embodiments of the method of the invention mentioned are advantageous for the reason that they may be put into practice using simple means and are sturdy in use.

A further advantageous embodiment of the method of the invention is characterized in that in the step (a) the compensation masses are moved until using two oppositely placed sensors it is determined that the compensation masses are at the sensors. The sensors consequently serve to detect when the compensation masses are offset by 180° in relation to one another or, respectively, have assumed the 0° and 180° positions.

A further advantageous embodiment of the method of the invention is characterized in that in the step (c) the angle of shift is registered using an encoding means.

A further advantageous embodiment of the method of the invention is characterized in that in the step (c) the angle of shift is registered using a clock generator arranged on the adjustment means.

A further advantageous embodiment of the method of the invention is characterized in that in the step (c) the angle of shift is registered on the basis of the duration of the positional resetting or adjustment movement.

Finally a further and advantageous form of the method of the invention is characterized in that in the step (c) the angle of shift is registered on the basis of the current consumption during shift.

BRIEF DESCRIPTION OF THE DRAWINGS

The FIGURE is a diagrammatic view of compensation masses, sensors and associated vectors in accordance with a method embodiment of the invention.

DETAILED DESCRIPTION OF PREFERRED EMBODIMENTS

One embodiment of the method in accordance with the invention, in the case of which the compensation mass is shifted through an angle α, will now be described using the accompanying drawing, which diagrammatically shows a preferred embodiment of the invention in the form of a means for the performance of the method.

Firstly the compensation masses m1 and m2 present in the automatic balancing machine are moved into the neutral zero positions, the compensation masses m1 and m2 being offset in relation to one another. The fact that the compensation masses m1 and m2 are in the zero positions is registered by the sensors S1 and S2. The output signals of the sensors S1 and S2 are supplied to a principal control means so that same causes a measuring circuit to measure the vector V1, which represents the true or actual imbalance of the system comprising the balancing machine and the body of revolution. After V1 has been measured, at least one of the compensation masses is shifted through an angle of α, something which is represented by the compensation mass m2*. By shift of the compensation mass m2* through the angle α an additional imbalance is produced with the imbalance vector V2. The angle β is the angle between the imbalance vector V1 and the imbalance vector V3, which results from the shift of the compensation mass m2*. The value of the angle α is registered in the balancing machine and stored.

Together with the imbalance present the resulting vector V2 constitutes an overall imbalance with the overall imbalance V3, which is measured in terms of its magnitude and direction. From the resulting vector V3 and the imbalance vector V1 a computing circuit arrangement in the balancing machine calculates the resulting imbalance vector V2 in accordance with the equation:

$$V2=V3-V1.$$

It is now established which imbalance vector V2 is produced by the movement of the compensation mass m2 through the angle α a and such values can be employed to calculate positions, which the compensation masses must be moved to in order to compensate for the imbalance V1 present.

On resetting the distance of the compensation mass from the axis of rotation the system is calibrated in an analogous manner, something which does not require any further explanation.

The shifting of the compensation mass m2 through a known angular amount or by resetting the distance of the compensation mass from the axis of rotation the system comprising the balancing machine and the body of revolution is calibrated in relative magnitudes. The phase shift and the damping of the amplitude of oscillating of the system are also registered by this calibration operation. Accordingly there is no longer any trial and error method in accordance with the prior art and the compensation masses may be systematically moved into the correct positions.

What is claimed is:

1. A method of balancing a body of revolution in a balancing machine, the balancing machine including an adjustment unit for resetting the position of compensation masses, the method comprising:

(a) placing the compensation masses in respective zero positions, wherein imbalance vectors produced by the compensation masses cancel each other out;

(b) measuring a system imbalance vector V1 in terms of its magnitude and direction, the system being defined as comprising the balancing machine and the body of revolution;

(c) resetting at least one of the compensation masses by shifting said at least one compensation mass through a desired angle or by changing a distance between said at least one compensation mass and an axis about which said at least one compensation mass turns, thereby producing an additional imbalance having a calibration imbalance vector V2;

(d) measuring said angle or the change in said distance;

(e) measuring an overall imbalance vector V3 in terms of its magnitude and direction;

(f) calculating said calibration imbalance vector V2 by subtracting said system imbalance vector V1 from said overall imbalance vector V3, as follows:

$$V2=V3-V1; \text{ and}$$

(g) moving the compensation masses out of said respective zero positions such that the system imbalance vector V1 is compensated for.

2. The method of claim 1, wherein in (a) a shift of the compensation masses is registered in terms of a direction and/or amount of shift and the compensation masses are brought into the zero positions by being moved back through the respectively traveled shift amount in the opposite direction of the shift.

3. The method of claim 1, wherein in (a) a direction and/or amount of shift of the compensation masses is registered using means for encoding.

4. The method of claim 1, wherein in (a) a direction and/or amount of displacement of the compensation masses is registered using a clock generator arranged on the adjustment unit.

5. The method of claim 1, wherein in (a) an amount of displacement of the compensation masses is registered on the basis of the duration of their movement, and a direction of movement of the compensation masses is registered on the basis of a direction of turning of the adjustment unit.

6. The method of claim 1, wherein in (a) an amount of displacement of the compensation masses is registered on the basis of the current consumption involved in their movement, and a direction of movement of the compensation masses is registered on the basis of a direction of turning of the adjustment unit.

7. The method of claim 1, wherein in (a) the compensation masses are displaced until two mutually opposite sensors detect that the compensation masses are at the sensors.

8. The method of claim 1, wherein in (c) said angle is registered using means for encoding.

9. The method of claim 1, wherein in (c) said angle is registered using means for stepping arranged on the adjustment unit.

10. The method of claim 1, wherein in (c) said angle is registered on the basis of a duration of movement of the at least one compensation mass.

11. The method of claim 1, wherein in (c) said angle is registered on the basis of current consumption during movement of the at least one compensation mass.

* * * * *